Figure 4:
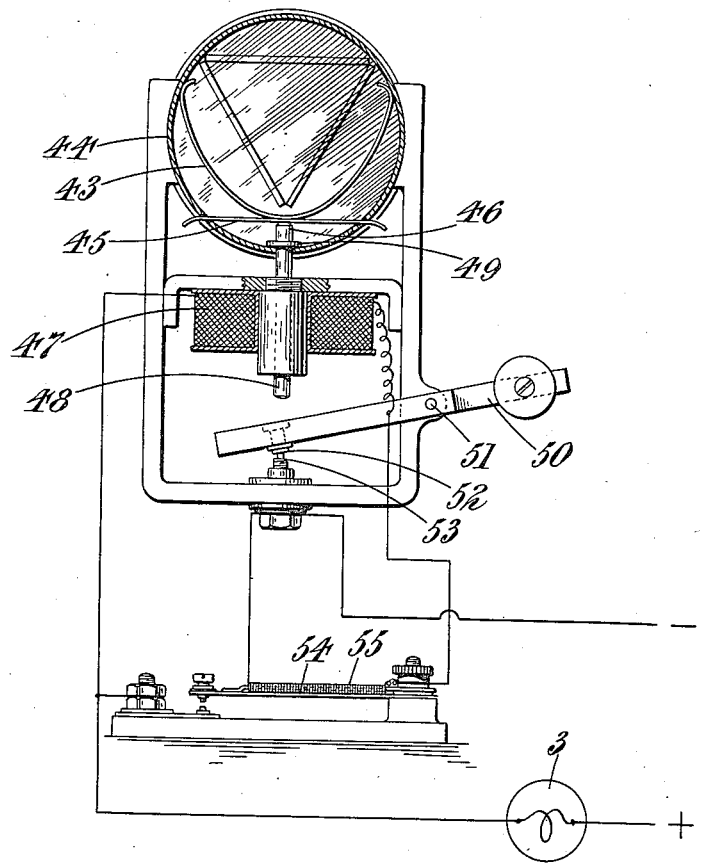

May 8, 1923.
S. F. J. RIDDELL ET AL
1,454,691
ADVERTISING SIGN AND THE LIKE
Filed Jan. 17, 1921
2 Sheets-Sheet 1
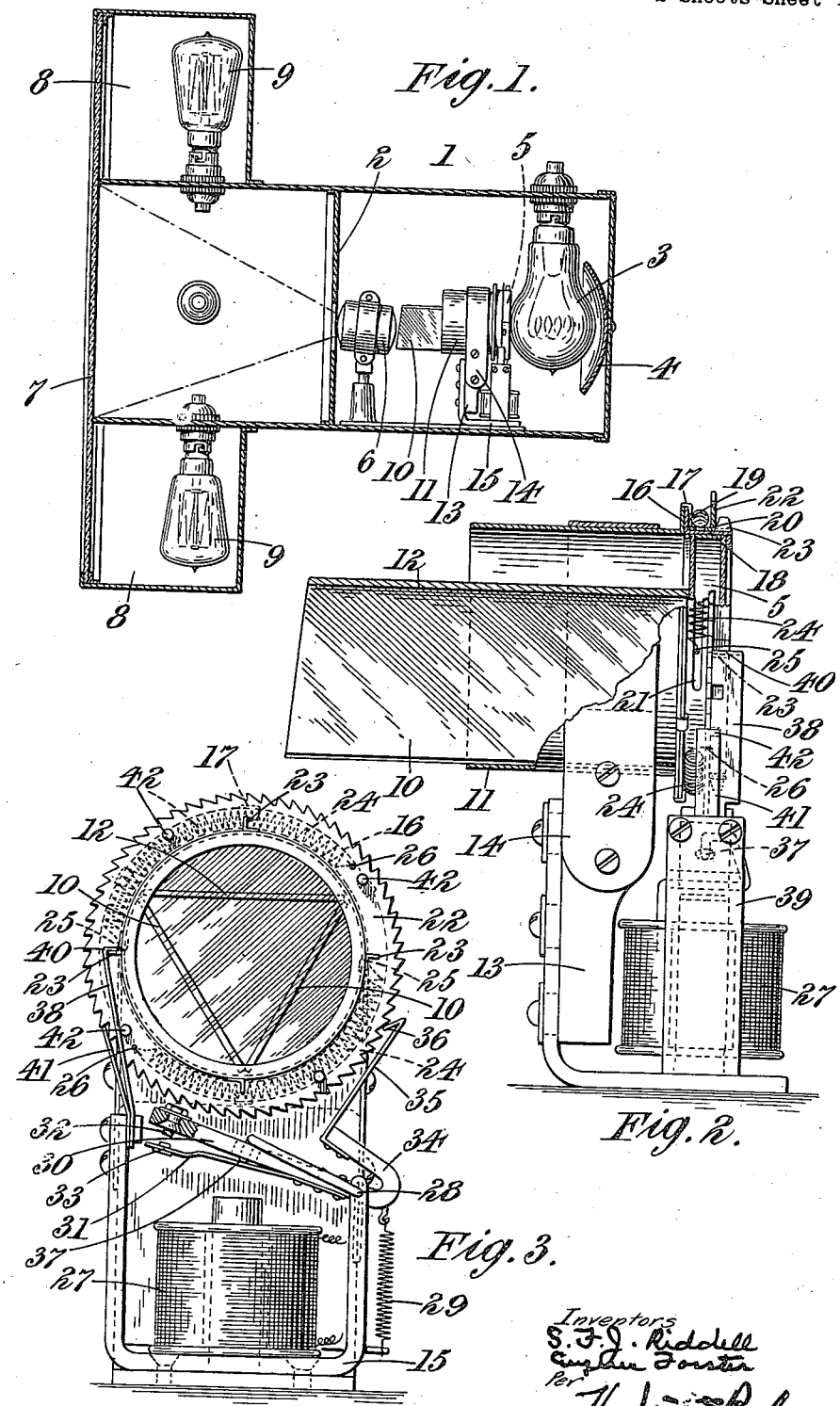

May 8, 1923.

S. F. J. RIDDELL ET AL 1,454,691

ADVERTISING SIGN AND THE LIKE

Filed Jan. 17, 1921

2 Sheets-Sheet 2

Patented May 8, 1923.

1,454,691

UNITED STATES PATENT OFFICE.

STUART F. J. RIDDELL, OF RAVENSCOURT PARK, AND EUGENE FORSTER, OF RICHMOND, ENGLAND.

ADVERTISING SIGN AND THE LIKE.

Application filed January 17, 1921. Serial No. 437,744.

*To all whom it may concern:*

Be it known that we, STUART FREDERICK JAMES RIDDELL, a subject of the King of Great Britain and Ireland, and resident of Ravenscourt Park, Middlesex, England, and EUGENE FORSTER, a subject of the King of Sweden, and resident of Richmond, Surrey, England, have invented new and useful Improvements in or Relating to Advertising Signs and the like, of which the following is a specification.

This invention relates to improvements in advertising signs and the like and it has for its object to provide improvements by which certain advantages shall be obtained.

According to the present invention, an advertising sign or the like comprises the combination with a kaleidoscope, of means to project the kaleidoscopic pattern on to or through a screen, for example, light producing means at one end and a lens at the other end of the kaleidoscope and means to cause a re-arrangement of the pattern producing particles of the kaleidoscope. Thus, means may be provided to cause an intermittent re-arrangement of the pattern producing particles by rotating the kaleidoscope, or by agitating the pattern producing particles by jarring the chamber containing them. When rotary motion is employed, preferably only the pattern producing part is rotated.

When the pattern producing particles are agitated by jarring the chamber containing them, there may be combined with the chamber a movable member disposed in proximity thereto and means, for example, electro-magnetic means to cause the said member intermittently to jar the said chamber.

According to a modification of the present invention, the pattern producing particles may be coated with or have magnetic particles attached thereto and they may be caused intermittently to be re-arranged by the application thereto of a magnetic force.

Forms of the present invention will now be described with reference to the accompanying drawings, wherein:—

Fig. 1 shows an elevation partly in section of one form of the invention,

Fig. 2 a side elevation partly in section of the kaleidoscope and driving means therefor.

Fig. 3 an end elevation thereof, and

Fig. 4 an end elevation partly in section of a second form of the invention.

Referring to Figs. 1, 2 and 3, within a box 1 divided by an apertured partition 2 is arranged a source of illumination, for example, an electric lamp 3 and behind it a mirror 4. In front of the lamp is the kaleidoscope 5 and a lens or lens system 6. The kaleidoscopic pattern is projected on to a screen 7 of ground glass or glass covered with thin paper, and is viewed from the outside thereof. In the form of the invention illustrated, the ground glass screen 7 is circular and is extended so as to cover an annular chamber 8 within which are illuminating means 9. On the annular portion of the screen 7 illuminated by the means 9 are formed the letters or figures of an advertisement so that the latter surround the kaleidoscopic pattern projected on to the central portion of the screen 7.

The kaleidoscope comprises two parts, the pattern producing part only being rotatable. Two mirrors 10 are arranged at an angle within a brass tube 11 with their adjacent edges on the lowest or the highest part thereof and projecting therefrom. Across the top of the mirrors is a non-reflecting member 12. Though it is usually sufficient to employ two mirrors 10, it is to be understood that the member 12 may be replaced by a third mirror if desired, or more than three mirrors may be employed. The tube 11 is secured to a supporting member 13 by a band 14 and said member 13 is carried on a bracket 15 secured in the box 1. The tube 11 has formed at its rear end a flange 16 having projections 17. Against the flange 16 is placed a short cylindrical member 18 having a flange 19, and the projections 17 are bent over the flange 19 so that the said member is rotatably supported. The member 18 has glass at the back and front and contains the means for forming the kaleidoscopic pattern. A second cylindrical member 20, having two oppositely arranged slots 21, surrounds the cylindrical member 18 and has a flange 22 with a toothed edge. When the member 20 has been placed in position, four equally spaced vanes 23 are soldered or otherwise secured to the member 18. Surrounding the cylindrical member 20 are two springs 24 each hooked at one end through a slot 21 into holes 25 in the cylindrical member 18 and into holes 26 in the flange 22. The driving means comprises an electro-magnet 27 and an armature pivoted at 28 and controlled by a spring 29. The armature comprises two parts 30 and 31 riveted together at one end and each carrying a contact 32, 33 respectively. At the opposite end the armature is bent back on itself at 34 and carries an arm 35 having at its end a hook 36 to engage with the teeth on the flange 22. The pivot pin 28 of the armature is extended and bent over at 37 to pass through a hole in the portion 30 of the armature, so as to constitute a stop for opening the contacts at the top of their movement. A spring member 38 attached to the frame 39 has a hooked end 40 which engages with the vanes 23 and a second member 41 engages with the teeth on the flange 22 to prevent the cylindrical member 18 from moving backwards. The electromagnet is connected in series with the illuminating means 3 and the contacts 32, 33 are arranged to short circuit the magnet.

The operation of the apparatus is as follows:—

When switched on, the magnet becomes energized and attracts the two part armature, whereby the hook 36 engages the teeth on the flange 22 and rotates the cylindrical member 18. At the bottom of the stroke of the armature the contacts 32, 33 are brought together, whereby the electro-magnet is short circuited and the armature is returned, under the action of the spring 20, to its original position until the stop 37 engages a portion of the armature 31 and opens the contacts so that the electro-magnet again becomes energized. As the member 21 rotates, the springs 24 are stretched and this continues until a stop 42 on the flange 22 moves against the spring arm 38 and releases it from the vane 23. At this point, the springs 24 cause the pattern producing portion 18 of the kaleidoscope to revolve a quarter of a revolution until the next vane 23 is caught by the hook 40; thus the pattern is changed rapidly and then allowed to remain stationary for a period. It is to be understood that other means may be employed for rotating the kaleidoscope, for example, an electric motor, a clockwork motor, an air-current motor or electrically operated mechanism of the solenoid and plunger type.

Referring to Fig. 4, the pattern producing particles are contained in a cup-shaped chamber 43 supported within a narrow cylindrical chamber 44 on a horizontal spring support 45 carried at its ends in the walls of the chamber 44. Projecting through the wall of the chamber 44 and at its lowest point is a rod 46, preferably of non-magnetic material, which is supported between the poles of an electro-magnet 47 with its end 48 projecting slightly beyond them. A pin 49 through the rod at its upper end projecting into the chamber 44 maintains it in position. An armature 50 for the electro-magnet is pivoted at 51 and on its underside carries a contact 52 which co-operates with a second contact 53 carried in the frame work of the apparatus.

The electrical connections of the apparatus are as follows:—

One terminal of the electrical supply is connected to the lamp 3 for projecting the kaleidoscopic pattern and the other terminal to the contact 53. The electro-magnet 47 is connected to the lamp 3 and to the armature 50, which armature constitutes a switch. A second switch comprises a spring member 54 of bimetal strip and a heating element 55 surrounding or close to it so arranged that the switch is open when cold. The switch is connected across the electro-magnet 47 and its pivoted armature 50, and the heating element is connected to the pivoted armature 50 and the contact 53.

The operation will not be described fully, but it will be understood that on switching on the apparatus the electro-magnet 47 becomes energized and attracts its armature 50, causing it to strike the rod 46 and jar the cup-shaped chamber 43, and thus cause a re-arrangement of the pattern producing particles. The movement of the contact 52 away from the contact 53 causes the heating element 55 to be connected in circuit, whereby the switch member 54 is operated and the electro-magnet is short circuited. This movement is repeated at intervals.

In the form of the invention in which the pattern producing particles are coated with or have magnetic particles attached thereto, the arrangement for intermittently energizing the electro-magnet may be of the form described with reference to Fig. 4 of the accompanying drawings.

In a modified form of the apparatus illustrated in Fig. 4, the spring supporting the cup-shaped chamber may be drawn down periodically by the electro-magnet, being suddenly released to cause agitation of the pattern producing particles.

Portions of the screen may be rendered opaque so as to produce the kaleidoscopic pattern or a part thereof on a specifically shaped area or areas, such, for example, as letters or figures or other shapes constituting an advertisement sign. Thus the forms of the letters or figures may be opaque or the area surrounding them may be opaque.

In certain cases the pattern or part thereof constituting the advertisement may be arranged to reflect the kaleidoscopic pattern instead of transmitting it as described above, and it may be of other shape than circular as described above. The apparatus according to the present invention provides means for projecting advertisements on to a screen such as a cinema screen.

Means may be provided for producing periods of darkness, such as a shutter or discs arranged between the kaleidoscope and the lamp 3 and in this way also the pattern may be gradually dissolved.

Further, a plurality of kaleidoscopes may be employed, one for each letter or for each portion of a sign. By building the apparatus into a wall, daylight may be employed as the illuminant.

If desired, the mirrors may also be rotated, in which case the whole pattern moves around a centre.

Two or more apparatuses may be arranged with their screens directed in opposite or different directions, and with one source of illumination, so that the sign will be visible from several directions.

What we claim is:—

1. An advertising sign forming a complete unit comprising in combination a chamber, a translucent screen at one end thereof, a kaleidoscope within said chamber, automatic means to cause intermittent rearrangement of the pattern producing particles, and means to project the kaleidoscopic pattern on to the screen comprising light producing means at one end and a lens at the other end of the kaleidoscope.

2. An advertising sign forming a complete unit comprising in combination a chamber, a screen at one end thereof, a kaleidoscope within said chamber, automatic means to cause the rearrangement of the pattern producing particles, means to project the kaleidoscopic pattern on to the screen, and separate illuminating means in the chamber to illuminate a part of the screen.

3. An advertising sign forming a complete unit comprising in combination a chamber, a screen at one end thereof, a kaleidoscope within said chamber, automatic means to cause the rearrangement of the pattern producing particles, means to project the kaleidoscopic pattern on to the screen, a second chamber and screen in juxtaposition to the first mentioned chamber and screen and separate illuminating means in said second chamber.

4. An advertising sign forming a complete unit comprising in combination a chamber, a screen at one end thereof, a kaleidoscope within said chamber, automatic means to cause the rearrangement of the pattern producing particles, means to project the kaleidoscopic pattern on to the screen, a separate chamber surrounding the screen on to which the kaleidoscopic pattern is projected, a screen at one end of said chamber, and separate illuminating means in said chamber.

5. An advertising sign forming a complete unit comprising in combination a chamber, a screen at one end thereof, a kaleidoscope within said chamber, electro-magnetic means to cause a rearrangement of the pattern producing particles, and means to project the kaleidoscopic pattern on to the screen, and separate illuminating means in the chamber to illuminate a part of the screen.

6. An advertising sign forming a complete unit comprising in combination a chamber, a screen at one end thereof, a kaleidoscope within said chamber having a pattern producing part comprising a rotatable short cylindrical member with transparent ends, a second cylindrical member surounding the short cylindrical member, a spring connected between the cylindrical members, mechanism to rotate the second cylindrical member and means to hold up the movement of the short cylindrical member against the spring until tripped by the movement of the second cylindrical member and means to project the kaleidoscopic pattern on to the screen.

7. An advertisement sign forming a complete unit comprising in combination a chamber, a screen at one end thereof, a kaleidoscope within said chamber having a pattern producing part comprising a rotatable short cylindrical member with transparent ends, a second cylindrical member surrounding the short cylindrical member, a spring connected between the cylindrical members, mechanism to rotate the second cylindrical member and a spring finger which engages at its end vanes secured to the cylindrical member and means to trip it comprising a pin carried on the second cylindrical member which engages the spring finger and move it out of engagement with the vanes, and means to project the kaleidoscopic pattern on to the screen.

8. An advertising sign forming a complete unit comprising in combination a chamber, a screen at one end thereof, a kaleidoscope within said chamber having a pattern producing part comprising a rotatable short cylindrical member with transparent ends, a second cylindrical member surrounding the short cylindrical member, a spring connected between the cylindrical members, an electro-magnet, a spring controlled pivoted armature therefor, an arm operated by the armature and engaging teeth on the flange of the second cylindrical member, contacts so operated by the movement of the armature towards the magnet that the latter then becomes de-energized, means to hold up the movement of the short cylindrical member against the spring until tripped by the movement of the second cylindrical member and means to project the kaleidoscopic pattern on to the screen.

9. An advertising sign forming a complete unit comprising in combination a chamber, a screen at one end thereof, a kaleidoscope within said chamber having a pattern producing part comprising a rotatable short cylindrical member with transparent ends, a second cylindrical member surrounding the short cylindrical member, a spring connected between the cylindrical members, an electro-magnet, a spring controlled pivoted armature therefor formed in two parts arranged side by side, an arm operated by the armature and engaging teeth on the flange of the second cylindrical member, a contact on each part of the armature, a stop to engage one part as the armature moves away from the magnet to separate the contacts, means to hold up the movement of the short cylindrical member against the spring until tripped by the movement of the second cylindrical member, and means to project the kaleidoscopic pattern on to the screen.

Dated this 1st day of January, 1921.

STUART F. J. RIDDELL.
E. FORSTER.